United States Patent [19]

Miranda

[11] 3,905,618
[45] Sept. 16, 1975

[54] FOLDABLE RIDING VEHICLE

[76] Inventor: Andrea Miranda, Via Meloria, 8, Milan, Italy

[22] Filed: May 10, 1973

[21] Appl. No.: 359,038

[30] Foreign Application Priority Data
May 19, 1972 Italy.................... 24586/72

[52] U.S. Cl............................. 280/278; 280/87.05
[51] Int. Cl............................................ B62k 15/00
[58] Field of Search .......... 280/278, 287, 282, 274, 280/87.05, 7.15

[56] References Cited
UNITED STATES PATENTS

| | | | |
|---|---|---|---|
| 1,428,496 | 9/1922 | Roquefort-Villeneuve......... | 280/278 |
| 1,508,621 | 9/1924 | Sisk et al. ........................... | 280/274 |
| 1,560,288 | 11/1925 | Murvay............................ | 280/87.05 |
| 2,619,364 | 11/1952 | Carson.............................. | 280/287 |
| 2,877,047 | 3/1959 | Weil................................... | 280/41 R |

FOREIGN PATENTS OR APPLICATIONS

| | | | |
|---|---|---|---|
| 682,562 | 5/1930 | France............................. | 280/7.10 |

Primary Examiner—Kenneth H. Betts
Assistant Examiner—Jack D. Rubenstein
Attorney, Agent, or Firm—Wolder & Gross

[57] ABSTRACT

A foldable riding vehicle construction particularly suited for a three-wheeled unit.

The front and rear support struts are independently pivotally secured to the horizontal frame member. They are also pivotally joined by a rigid link which is journalled to the rear strut below the frame pivot and to the front strut, also below the frame pivot. Applying a force to one of the struts in a counterclockwise direction results in a translation of the force to the other strut via the link, causing both struts to fold against the frame.

A retaining member may be slidably secured to the frame member by means of a diagonal slot and so positioned to engage the rear support strut. When the retaining member is located in its lowermost position within the slot and the rear strut and forward strut are in the erect position the retaining member bears against the rear wall of the rear support strut preventing the struts from folding against the frame. Prior to folding, the retaining member is moved to the uppermost position within the slot to allow the rear support strut to pivot. When the unit has been collapsed the retaining member may then be moved downwardly to the lowermost position in the slot and positioned against the rear support strut to assist in retaining the unit in the folded position. For ease of transport the rear portion of the seat may be hollow to provide a hand support gripping receptacle.

9 Claims, 10 Drawing Figures

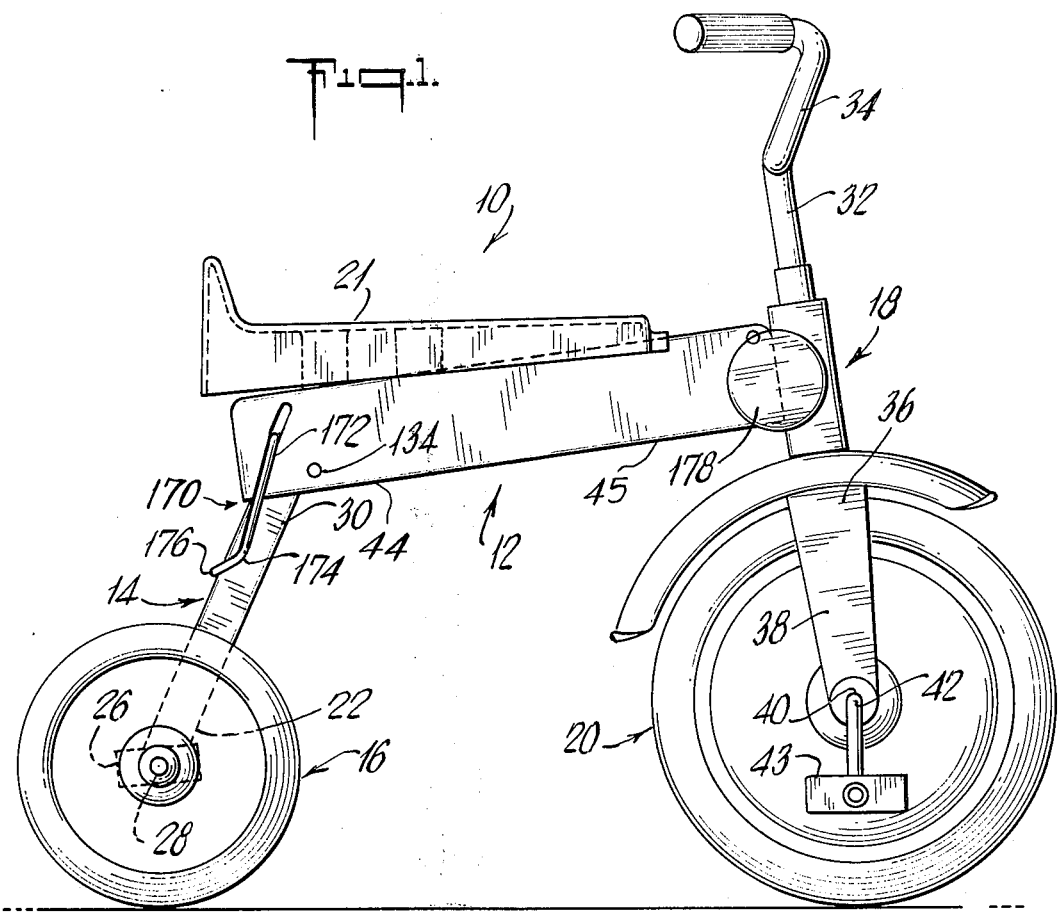
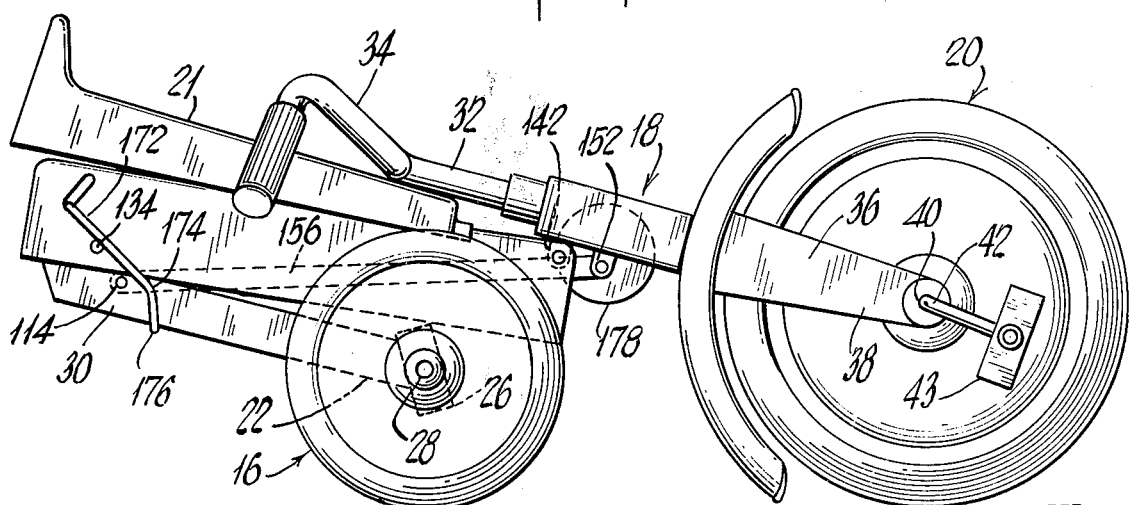

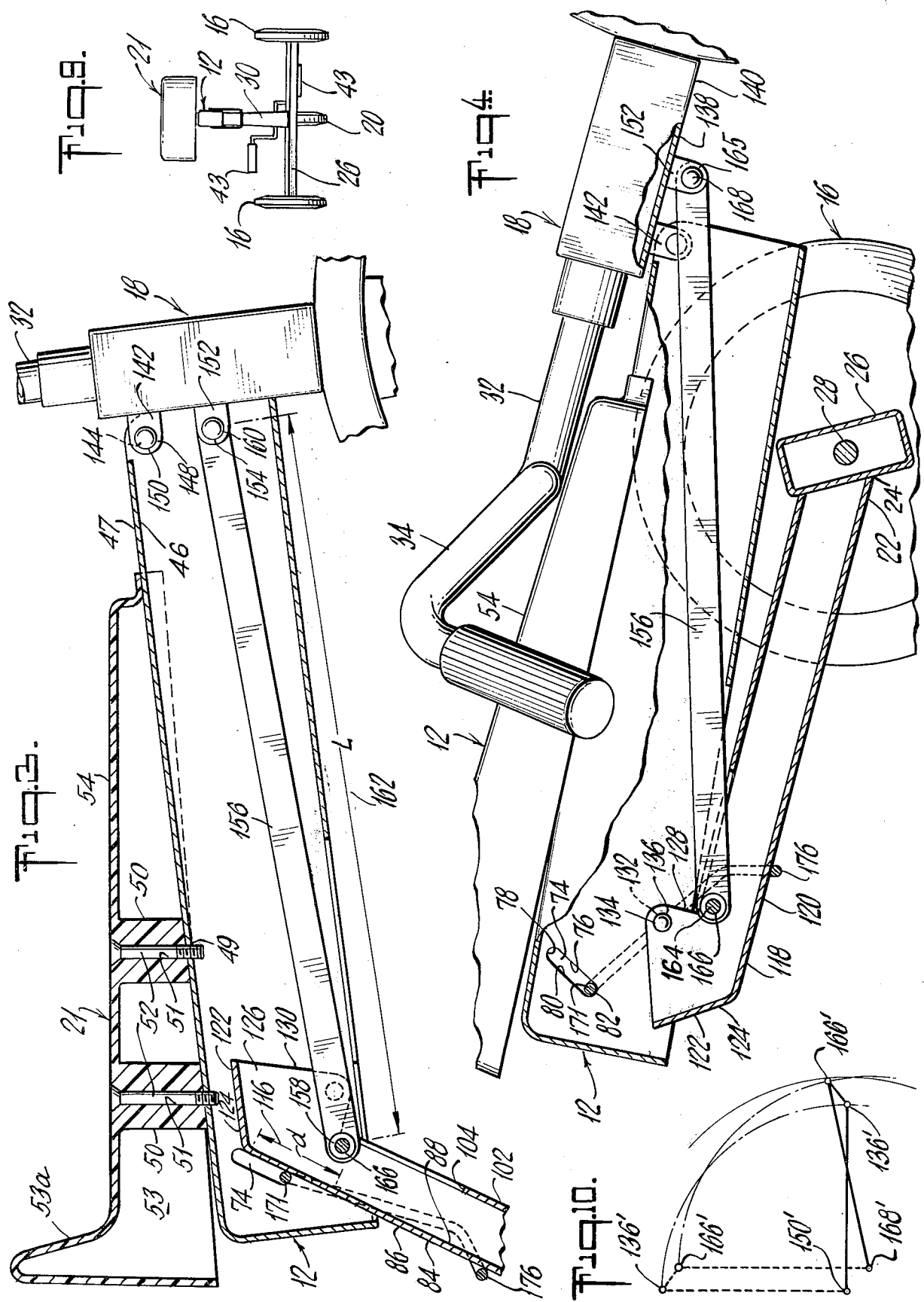

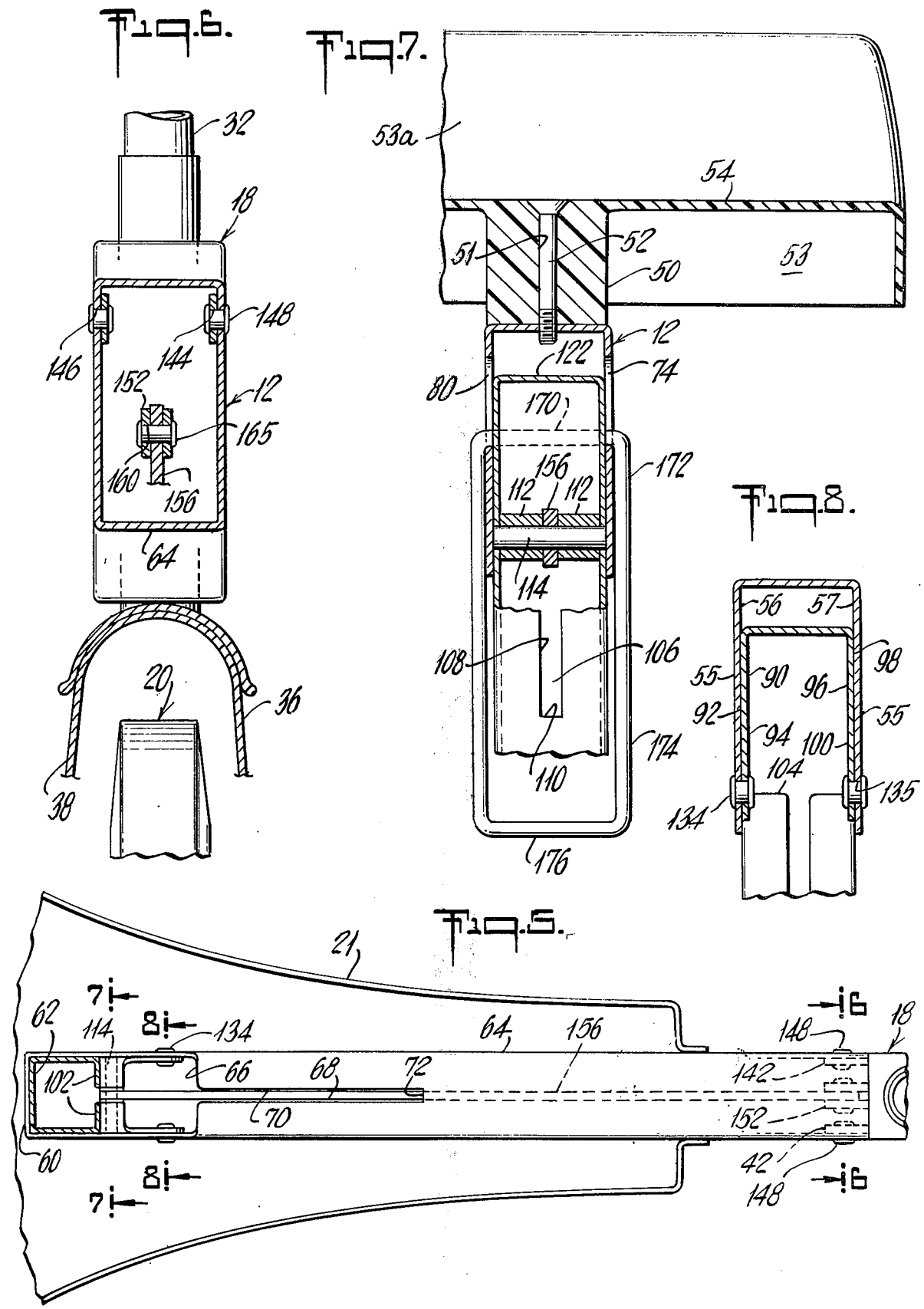

FOLDABLE RIDING VEHICLE

This invention relates to foldable riding vehicles and more particularly to a riding vehicle which contacts the riding surface in three places, such as tricycles.

PRIOR ART

The need for reducing the amount of cubic volume occupied by certain items when not in use, particularly toys and recreational articles in general, has become of increasing value in today's modern society. There has been a continuing and substantial increase in such items, but there is a limit to the amount of volume available for storage within the average user's living space. Furthermore, because of the nature of these items, there is a tendency to transport them from one location to another, for example, when taking a vacation.

This problem becomes particularly acute with respect to items such as a child's tricycle, which serves not only as a toy, but as a piece of athletic equipment. There are times during a child's development when the tricycle becomes an important part of the play cycle. Thus, it is necessary to transport the tricycle together with the child, and this may require moving on public transportation, or it may mean storing the tricycle in a location such as in a house or an apartment, without taking up an inordinate amount of space.

Examples of foldable vehicles in the prior art are numerous, and were designed not only for the purpose of ease of transport, but also for ease of packaging, storage, and delivery. Such vehicles may be foldable at the handle bars both in planes parallel to and perpendicular to the major plane of the vehicle. The same may be the case for the rear wheels which can be folded along their axes and towards the main body of the vehicle. Furthermore, the rear wheels may be dissembled from the vehicle and the upper portion of the handle bars above the steering column may be turned sideways.

Bicycles may be folded along hinges so that the front and rear sections lay in adjacent but parallel planes. Also, the hinges may be designed so that the sections rotate in opposite circular motions toward each other, with the hinge being slightly off center to allow aligned, but adjacent collapsed positioning.

None of the prior art constructions are particularly simple or provide a solid, rigid construction while the device is in use.

OBJECTS AND ADVANTAGES

Accordingly, among the principal objects of the present invention is to provide a foldable riding vehicle construction which provides for use of the most stable three-wheeled vehicular construction presently known.

Still another object of the present invention is to provide a foldable riding vehicle construction which has a simple folding linkage.

Still yet another object of the present invention is to provide a device of the character described whose folding linkage construction is significantly strong and stable.

Still yet a further object of the present invention is to provide a construction for a foldable riding vehicle which accomplishes the actual folding by means of a single movement.

Still yet a further object of the present invention is to provide a foldable riding vehicle construction which results in a very efficient reduction in outer cubic volume dimensions.

Still yet another object of the present invention is to provide a vehicle of the character described whose linkage is designed to provide increased stability, especially against folding, when a child is positioned on the seat, thus eliminating all possibility of foldable collapsing without any further locking means.

Still yet another object of the present invention is to provide a construction of the character described which when assembled has a safety retaining member to further prevent folding.

Still yet a further object of the present invention is to provide a device of the character described where the safety retaining member also acts to assist in keeping the unit in its folded condition after folding has been completed.

Still yet another object of the present invention is to provide a riding vehicle construction of the character described in which the seat has means to serve as a handle for ease in carrying the vehicle when it is in the folded condition.

Still yet another and further object of the present invention is to provide a foldable riding vehicle which has a simple overall construction.

Still yet another object of the present invention is to provide a foldable riding vehicle construction which is as simple and inexpensive to manufacture and assemble, and yet is durable to a high degree in use.

The present invention contemplates a foldable riding vehicle construction which consists of a horizontal frame member to which are pivotally secured a rear support strut and a front support strut at fixed pivot points. The front support strut carries handle bars, a steering column and a front wheel fork to which is secured a standard front wheel and pedals in the well known manner. The rear support strut is secured to an axle and a platform at either end of which are journalled rear wheels. The struts, the frame, and the line joining the axes of the front rear walls substantially form a trapezium as distinguished from the ordinary tricycle configuration with a curved rear section. This is considered a much safer and stronger construction. The horizontal frame member carries a seat support, the rear portion of which is hollowed out.

A rigid link is pivotally connected at one end to a pivot point on the rear support strut, below the fixed pivot point connecting the rear strut and the horizontal frame member. At the other end it is connected to the front support strut at a pivot point below the fixed pivot point connecting the front strut and the horizontal frame member.

If a counterclockwise force is exerted against either of the struts the strut in question tends to turn on its fixed pivot point with respect to the frame. This, in turn, is translated through the link to the other strut and causing both struts to turn and hence fold in the same direction. The struts continue folding until they are substantially flush against the horizontal frame.

Since the front and rear struts are directed outwardly from each other, it is obvious that any force applied to the seat, such as a child sitting on it, will be translated through the frame and will only tend to force the overall assembly to be more rigid in its erect configuration. Thus, the design itself is such that the tricycle cannot be collapsed when a child is in the seat.

Slidably secured to the frame by means of a diagonal slot is a safety retaining member, to the rear of and in contact with the rear support strut. When the unit is in erect condition, the retaining member is in its lowermost position in the slot and bears against the rear wall of the rear support strut further preventing the unit from folding. When folding is to occur the retaining member is moved to the uppermost position within the slot and the rear support strut can then pivot without bearing against the retaining member. When the unit has been completely folded the retaining member may then be returned to its lowermost position in its slot and positioned against the rear wall of the rear support strut to aid in keeping the unit in folded condition.

The hollowed out portion in the rear of the seat may be used as a gripping receptacle for ease in carrying the unit.

The above description and objects of the present invention will become apparent from a reading of the following description taken with reference to the accompanying drawings, wherein:

FIG. 1 is a side elevational view of a foldable riding vehicle embodying my invention, with the interior structure of the seat, a portion of the strut and the rear platform shown in dotted lines;

FIG. 2 is a view similar to FIG. 1 showing the vehicle in fully folded condition with part of the shield broken away to illustrate the link and fixed pivot point connections;

FIG. 3 is a fragmentary enlarged view similar to FIG. 1, with portions cut away to show the folding structure when the unit is in its fully erect position;

FIG. 4 is an enlarged, fragmentary view similar to FIG. 2, showing the linkage mechanism when the unit is in fully folded condition;

FIG. 5 is an enlarged, fragmentary bottom plan view, partially in section, showing details of the underside of the frame, the seat, and portions of the struts;

FIG. 6 is an enlarged, partial elevational view taken along the line 6—6 of FIG. 5;

FIG. 7 is an enlarged, fragmentary partial sectional view taken along the line 7—7 of FIG. 5;

FIG. 8 is an enlarged, fragmentary view taken along the line 8—8 of FIG. 5;

FIG. 9 is a reduced, rear elevational view of the vehicle; and

FIG. 10 is a schematic view showing the geometrical configuration of the quadrilateral by the linkage in fixed pivot points of a different embodiment of the present invention, showing the elements in fully erect condition in solid lines and showing the linkage and joinder points of the fixed pivots in dotted fashion for the collapsed condition.

Turning in detail to the drawings, and more particularly to FIG. 1, there is shown a foldable riding vehicle 10 broadly comprising a horizontal frame member 12 pivotally joined to a rear support member or strut 14 at the lower end of which are attached rear wheels 16. The forward end of the frame is pivotally joined to the front support member or strut 18 to which is secured the front wheel 20. A seat 21 is attached to the frame member 12.

The rear support strut 14 includes a lower portion 22 which is rigidly secured at 24 to a support platform 26. An axle 28 is journalled to the platform and the two rear wheels 16 in the well known manner. The upper portion or trunk 30 of the rear support strut 14 will be discussed in detail below.

The front support strut 18 includes a steering column 32 at the upper end of which are secured handle bars 34 and at the lower end of which is secured a front wheel fork 36. The fork consists of lower feet 38 containing openings 40 through which passes an axle 42 journalled to the front wheel 20, all in the well known manner. Also secured to the axle 42 are pedals 43, again in the well known manner. The further detail of the front support strut 18 will be discussed below.

The horizontal frame member 12 is rectangular in appearance, with the rearward portion 44 slightly lower than the forward portion 45. Thus the frame is slightly askew with respect to the horizontal. The frame has an upper wall 46, defined by an upper surface 47 (FIG. 3). The wall contains threaded bores 49 which are in registry with the seat spines 50 containing bores 51 through which pass bolts 52 received within the threaded bores 49 to secure the seat firmly to the frame. Rearwardly of the spines is a hollow rear channel 53 defining a raised back 53a for the purpose hereinafter appearing. The seat 21 also has a forward upper wall portion 54. The seat is slightly askew to the frame member so the seat is substantially parallel to the horizontal.

Depending from upper wall 46 are side walls 55 (FIG. 8) defined by a left inner surface 56 and a right inner surface 57, and a rear wall 60 (FIG. 5) defined by an inner surface 62. The unit is enclosed by a shortened bottom wall 64 ending at a rear edge 66 from which depends a slot 68 defined by side edges 70 and ending in a forward edge 72. The slot extends towards the forward portion 45 of the frame.

Located in the rearward portion 44 of the frame is a diagonal slot 74 (FIG. 4) defined by a forward edge 76, a top edge 78, a rear edge 80, a bottom edge 82.

Turning again to the rear support strut 14, the trunk portion 30 has a rear wall 84 (FIG. 3) defined by an outer surface 86 and an inner surface 88. In addition, it has a left side wall 90 defined by an outer surface 92 and an inner surface 94, as well as a right side wall 96 defined by an outer surface 98 and an inner surface 100. The strut is enclosed by a forward wall 102 (FIG. 5) which ends at an upper edge 104 (FIGS. 3, 8). Depending downwardly from the upper edge is a slot 106 (FIG. 7) defined by side edges 108 and ending in a lower edge 110. Depending inwardly adjacent the upper edge 104 of the trunk 30 are oppositely disposed detents 112 having openings 114 defined therein.

Turning to FIGS. 3–4, the rear wall 84 of the trunk extends upwardly a distance $d$ which is noted by reference numeral 116. This additional length may be referred to as upper portion 118 and is defined by an outer surface 120. The strut then bends forwardly and terminates in an upper wall 122 defined by an outer surface 124. The side walls 90, 96 flare forwardly in upper portion 126 which is somewhat trapezoidal in configuration and is bounded by a lower edge 128, a forward edge 130.

Proximate the joinder point of the edges 128, 130 are openings 132 through which passes shafts 134 and mate with openings 135 in the side walls 55 of the frame. This locates the rear fixed pivot point 136 rearwardly and towards the lower part of the frame member.

Turning once again to the forward strut 18 there is defined a rear wall 138 (see FIGS. 3, 4) having an outer surface 140 and from which extend a first pair of dog ears 142 positioned on opposite edges of the wall. The ears contain openings 144 which mate with openings 146 (FIG. 6) in the frame and are joined by shafts 148 to form the forward fixed pivot point 150. This pivot point is positioned forwardly and towards the upper part of the frame support member. As seen in FIGS. 3 and 4, slots 151 are defined in upper wall 46 to accommodate pivotal movement of the ears.

Positioned below the first set of dog ears is a second set of dog ears 152 containing openings 154. This set is positioned proximate to each other (FIG. 6).

Link 156 is positioned within the interior of the support frame and has a rearward opening 158 and a forward opening 160. The length L of the link is defined by reference numeral 162. The rearward opening 158 aligns with openings 114 in the detents 112 through which passes a shaft 164, and in the same manner another shaft 165 passes through the second set of dog ears, respectively forming a rear movable pivot point 166 and a forward movable pivot point 168.

Link 156 is rigid and length L is sufficient to retain the struts 14, 18 in the erect condition as shown in FIG. 1. Furthermore, the length L is designed to allow the struts to assume the position shown in FIG. 2.

The safety retaining member 170 is slidably secured at one end within the diagonal slot 74 basically consists of a narrow cylindrical bent member which has two upper, inwardly extending fingers 171 from which depend two downwardly extending parallel first portions 172 and then slightly bent outwardly and rearwardly, downwardly extending portions 174 joined by a lower connecting portion 176.

The forward fixed pivot point 150 and moving pivot point 168 are protected by means of shields 178.

It is important that the radius r extending from the axis of the pivot point 136 be slightly less than the distance from the axis to the upper edge 78 of the slot 74 minus an amount equal to the diameter of the fingers 171. This insures that the strut 14 can freely pivot with upper portion 126 clearing the retaining member 170.

As seen in FIG. 2, the length of the struts, particularly strut 14, must be short enough to provide clearance between the front and rear wheels to insure proper folding.

In operation, the bike is normally in the erect condition shown in FIG. 1 with the safety retaining member in the lowest portion of the slot. Because of the outward spread of the front and rear struts as against the main frame, the presence of a weight upon the seat, such as that of a child, will only further to reinforce the erect rigid condition of the structure, thus making it impossible for the unit to collapse while the child is riding on the vehicle. The force from the weight of the child above the linkage is also transmitted from rear wall 84 of strut 14 to rear wall 60 of the frame 12, thus accomplishing the above-discussed insurance against collapse of the tricycle. As seen in FIG. 3, when the retaining member is in that position it further enhances the impossibility of rotating the rearward strut in a counterclockwise movement motion because the surface 120 will immediately engage the connecting portion 176 of the retaining member 170, thus preventing motion.

When it is desired to fold the vehicle, the retaining member is moved upwardly so fingers 171 are in the uppermost position of the diagonal slot engaging the upper edge 78. A force is then applied to the strut support to rotate the support around the fixed pivot point 136 in the counterclockwise direction. This force is translated via the rearward moving pivot point 166 and through the link 156 to the forward pivot point 168 where a similar force is exerted on the forward strut 18, also causing it to move in the counterclockwise direction. Because of the angular and length relationships between the struts, and the link, when the rear platform 26 engages the lower surface of the bottom wall 64 (as seen in FIG. 4), the rear surface of the handle bars engages the upper surface of the forward portion 54 of the seat 21. The overall construction results in a significant reduction in cubic volume.

In this condition, the safety retaining member 174 is then returned to the lowermost portion of the diagonal slot 76 so that it is resting against lower edge 82, and then the connecting portion 176 is then moved downwardly along the surface 86 of the rear wall 85 providing a firm, somewhat positive retaining means while the unit is in folded condition (FIG. 2).

As seen in FIG. 3, the carrier's hands or fingers may be positioned within the channel 53 (the tips of the fingers extending into that part formed from the back 53a) providing a grip upon the vehicle adding for ease of carrying. A horizontal opening (not shown) may also be defined in the back 53a for ease of carrying.

Turning to the embodiment shown in schematic in FIG. 10, it is seen that the linkage is slightly differently positioned from that of the main embodiment in that the link extends downwardly rather than upwardly so that the rear moving pivot point 166' is vertically higher than the forward pivot point 168' in the erect condition. As shown in the schematic, the forward fixed pivot point 150' and the rear fixed pivot point 136' are essentially in the same horizontal plane, but this is dependent upon the frame construction and presents no changes to the problems resolved by the present invention. Furthermore, in the folding or collapsing of the modified embodiment, the forward fixed and movable pivot points 150', 168', are shown as not moving, solely for the purposes of illustration.

It is also obvious from the examination of this linkage that the application of a downward vertical force, such as a child sitting in the seat, would be passed downwardly through the rear strut 14 in a similar manner to that of the main embodiment and would also maintain the tricycle in erect condition, thus making it impossible for the unit to collapse while the child is positioned thereon.

It is also obvious that folding can be as easily accomplished as in the main embodiment. Finally, it should be noted that the fixed pivot point 150' is forwardly of the moving forward pivot point 168', which is also unlike the main embodiment, but which allows for better functional operation of the modified embodiment.

While there has been described and illustrated a preferred embodiment of the present invention, it is apparent that numerous alterations, omissions and additions may be made without departing from the spirit thereof.

The embodiments of the invention in which an exclusive property or privilege is claimed are defined as follows:

What is claimed is:

1. A foldable riding vehicle which comprises:
   a. a frame member including side walls having diagonal slots formed in the rear portions thereof;

b. a rear support member pivotally secured to the frame member towards its rear end forming a rear fixed pivot point and received within said frame member and having an upper portion positioned therein;

c. a front support member pivotally secured to the frame member at its forward end forming a forward fixed pivot point;

d. means secured to the rear and forward support members to allow movement of the vehicle;

e. a rigid link pivotally secured at one end to the rear support member adjacent the rear fixed pivot point, and at the other end to the forward support member adjacent the forward fixed pivot point;

allowing the application of a force to either the front or rear support members, causing movement of the member to which the force is so applied around its fixed pivot point, and allowing translation of the same force via the linkage and moving pivot point to the other support member to allow simultaneous movement of the other support member around its fixed pivot point, until the support members fold against the frame member; and f. safety means to insure retaining the rear and front support member in erect condition and including a narrow member having fingers extending inwardly of the slots and having downwardly extending portions joined by a lower connecting portion, the slot positioned on the wall to prevent rotational movement of the upper portion of the rear support strut when the fingers are in the lowermost position of the slot and to allow rotational movement of the rear support strut when the fingers are in the uppermost position in the slot.

2. The invention according to claim 1, gripping means for carrying the vehicle in folded condition.

3. The invention according to claim 2, a seat secured to the top of the frame member, the seat having a hollow channel defined in the underside thereof, the channel receptacle having sufficient depth to receive the fingers of a user so that the seat may be gripped and used to carry the vehicle in folded condition.

4. The invention according to claim 1, the frame member including an upper wall, said side walls depending from said upper wall, a rear wall, and a bottom wall, the bottom wall ending short of the rear wall, forming an opening, and a slot defined in the bottom wall extending forwardly for a distance.

5. The invention according to claim 1, the front support member including a front support strut, a steering column journalled in the strut, handle bars secured to the steering column, a front wheel fork secured to the opposite end of the steering column, a front wheel journalled to the fork, and pedals secured to the wheel.

6. The invention according to claim 1, the rear support member including a rear support strut, an axle, rear wheels journalled to the axle and means journalling the axle to the strut.

7. The invention according to claim 6, the rear strut including a trunk portion, an upper portion received within the frame member, the upper portion bounded by a lower edge and a forward edge, an opening defined in the upper portion proximate the joinder point of the edges, openings in the frame member aligned with the openings in the upper portions and means to pivotally mount the strut and frame member via the openings with respect to each other.

8. The invention according to claim 6, the front support member including a front support strut, a steering column journalled in the strut, handle bars secured to the steering column, a front wheel fork secured to the opposite end of the steering column, a front wheel journalled to the fork, and pedals secured to the wheel.

9. The invention according to claim 8, the front support strut including a rear wall, a first set of dog ears secured to the rear wall and spaced the width thereof and located at the upper portion thereof, openings defined within the dog ears, openings defined within the frame member and aligned with the openings in the dog ears, means pivotally joining the frame member and the dog ears to allow fixed pivotal movement between the frame member and the front support member, a second set of dog ears positioned below the first said end positioned proximate thereto, the second set containing aligned openings, the linkage being received between the dog ears and the forward opening of the link and the fittings of the dog ears being secured by means to allow moving pivotal movement between the link and the forward support strut.

\* \* \* \* \*